United States Patent
Yoon

(10) Patent No.: US 9,702,420 B2
(45) Date of Patent: Jul. 11, 2017

(54) DIAGNOSTIC METHOD FOR DETERMINING CLUTCH FAILURE OF DCT

(71) Applicant: HYUNDAI MOTOR COMPANY, Seoul (KR)

(72) Inventor: Young Min Yoon, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/138,941

(22) Filed: Apr. 26, 2016

(65) Prior Publication Data
US 2017/0130786 A1    May 11, 2017

(30) Foreign Application Priority Data
Nov. 5, 2015 (KR) .................. 10-2015-0155214

(51) Int. Cl.
F16D 48/06 (2006.01)
F16D 21/02 (2006.01)

(52) U.S. Cl.
CPC .......... *F16D 48/064* (2013.01); *F16D 21/02* (2013.01); *F16D 2500/10412* (2013.01); *F16D 2500/50284* (2013.01)

(58) Field of Classification Search
None
See application file for complete search history.

(56) References Cited

U.S. PATENT DOCUMENTS

| 2005/0107214 | A1 | 5/2005 | Koenig | |
| 2005/0258014 | A1* | 11/2005 | Berger | B60K 28/16 192/48.9 |
| 2011/0004383 | A1* | 1/2011 | Seufert | F16H 61/12 701/60 |
| 2013/0274062 | A1* | 10/2013 | Arai | F16H 61/12 477/5 |

FOREIGN PATENT DOCUMENTS

| JP | 2004-068712 | | 4/2004 |
| JP | 2007-255466 | A | 10/2007 |
| JP | 2010-151193 | A | 7/2010 |
| JP | 2010-221932 | A | 10/2010 |
| KR | 10-2010-0011135 | A | 2/2010 |
| KR | 10-2012-0038797 | A | 4/2012 |
| KR | 10-2015-0071155 | A | 6/2015 |
| WO | 2012/081191 | A1 | 6/2012 |

OTHER PUBLICATIONS

Notice of Allowance dated Dec. 12, 2016, issued in Korean patent application No. 10-2015-0155214.

* cited by examiner

*Primary Examiner* — Edwin A Young
(74) *Attorney, Agent, or Firm* — McDermott Will & Emery LLP

(57) ABSTRACT

A diagnostic method of determining clutch failure of a dual clutch transmission (DCT) includes comparing, by a controller, a wheel torque of a vehicle with a driving load torque of the vehicle, confirming, by the controller, whether or not the vehicle is driving, if, as a result of comparing step, the wheel torque is greater than the driving load torque, releas- (Continued)

ing, by the controller, a gear engaged with a non-drive shaft, if, as a result of the confirming step, the vehicle is in a stopped state, reconfirming, by the controller, whether or not the vehicle is driving, after the releasing step, and judging, by the controller, that a transmission clutch of the non-drive shaft fails, if, as a result of the reconfirming step, the vehicle is driving.

5 Claims, 3 Drawing Sheets

US 9,702,420 B2

DIAGNOSTIC METHOD FOR DETERMINING CLUTCH FAILURE OF DCT

CROSS-REFERENCE TO RELATED APPLICATION

This application claims the benefit of priority to Korean Patent Application No. 10-2015-0155214, filed on Nov. 5, 2015 with the Korean Intellectual Property Office, the disclosure of which is incorporated herein by reference.

TECHNICAL FIELD

The present disclosure relates to a diagnostic method for determining clutch failure of a dual clutch transmission (DCT), and more particularly to a clutch failure diagnostic method in which whether or not a clutch in a DCT mounted in a vehicle is abnormally operating may be properly diagnosed.

BACKGROUND

Recently, development of automated manual transmissions, which may achieve both driving convenience of automatic transmissions and high fuel efficiency and power efficiency of manual transmissions, has been actively carried out. A dual clutch transmission (DCT) is one kind of automated manual transmission.

An automated manual transmission is a system which automatically executes clutch operation and gear shifting based on a manual transmission, and such operations may be carried out by actuators which are operated hydraulically or by motors. Particularly, dry clutches are used and configured such that, when the dry clutch is controlled using a motor, the clutch is controlled through a link structure. If a link fails or the clutch become stuck, an engine may stall, creating a potentially adverse situation. Therefore, a clutch failure needs to be accurately diagnosed.

FIG. 1 is a graph illustrating a situation in which a clutch 1 is stuck and cranking of an engine is carried out in a state in which the engine and the clutch 1 are almost directly connected. FIG. 1 illustrates that, as an engine speed increases due to cranking of the engine, the speed of the clutch 1 is increased in synchronization with the speed of the engine. Therefore, whether or not the clutch 1 is stuck, i.e., fails, may be judged based on the synchronized state between the speed of the clutch 1 and the speed of the engine.

However, if a hybrid vehicle is used and the vehicle is driven in an EV mode, an engine is turned off, and thus it may not be possible to diagnose whether or not a clutch is stuck based on synchronization of the speed of the engine and the speed of a transmission clutch. Thereby, a misdiagnosis indicating that gear engagement is in a normal state may be made, thus resulting in stalling of the engine or another adverse situation.

The above description has been provided to aid in understanding of the background of the present disclosure and should not be interpreted as conventional technology known to those skilled in the art.

SUMMARY OF THE DISCLOSURE

Therefore, the present disclosure has been made in view of the above problems, and it is an object of the present disclosure to provide a clutch failure diagnostic method of a DCT in which, if a vehicle provided with the DCT is in an EV mode, whether or not a clutch of the DCT is stuck is diagnosed.

In accordance with the present disclosure, the above and other objects can be accomplished by the provision of a diagnostic method of determining clutch failure of a DCT including comparing, by a controller, a wheel torque of a vehicle with a driving load torque of the vehicle, confirming, by the controller, whether or not the vehicle is driving, if, as a result of the comparing step, the wheel torque is greater than the driving load torque, releasing, by the controller, a gear engaged with a non-drive shaft, if, as a result of the confirming step, the vehicle is in a stopped state, reconfirming, by the controller, whether or not the vehicle is driving, after the releasing step, and judging, by the controller, that a transmission clutch of the non-drive shaft fails, if, as a result of the reconfirming, the vehicle is driving.

The controller may execute the comparing step, if the driving mode of the vehicle is an EV mode.

The controller may execute the comparing step, if an engine clutch is released.

If, as a result of the reconfirming step, the vehicle is determined to be in a stopped state, the controller may judge that the transmission clutch of the non-drive shaft is in a normal state.

In the releasing step, the controller may release a first gear when a shift lever is located at the position R and release a second gear when the shift lever is located at the position N or position D.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Hereinafter, a clutch failure diagnostic method of a DCT in accordance with one embodiment of the present disclosure will be described with reference to the drawings.

Figure 1:
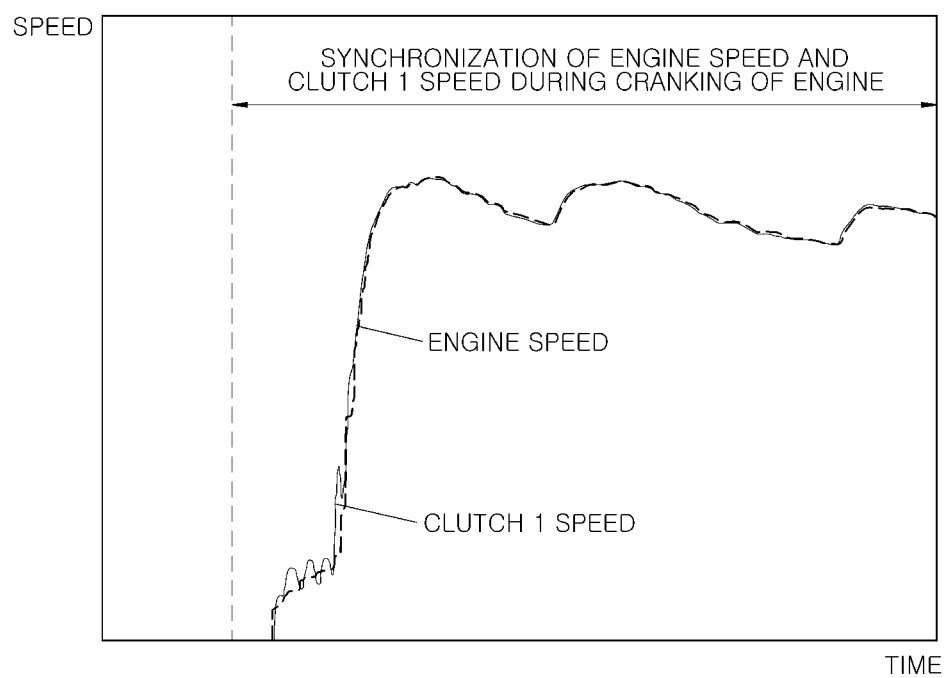
FIG. 1 is a graph illustrating a situation in which cranking of an engine is carried out in a state where a clutch is stuck.
Figure 2:
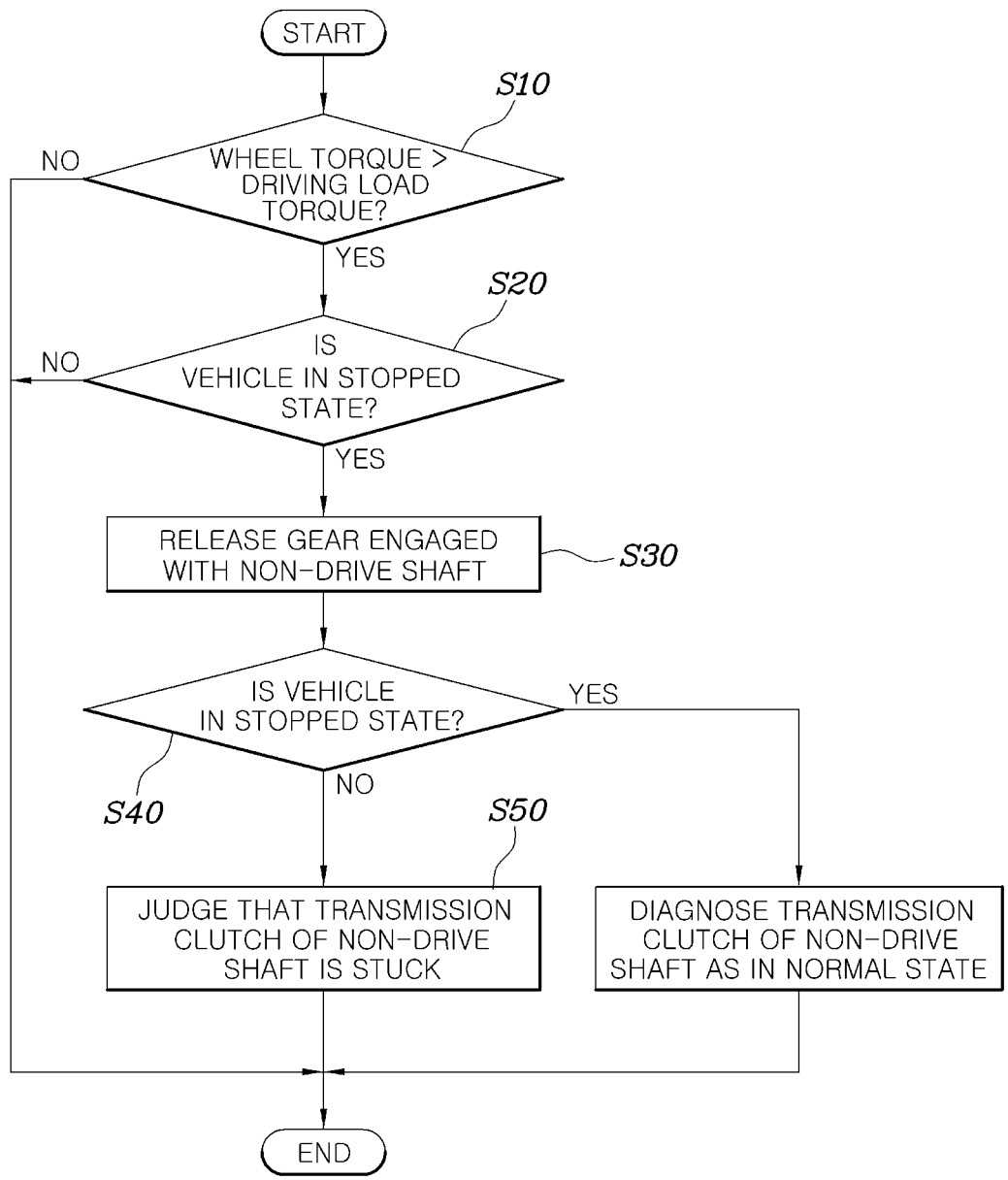
FIG. 2 is a flowchart illustrating a clutch failure diagnostic method of a DCT in accordance with an embodiment of the present disclosure.
Figure 3:
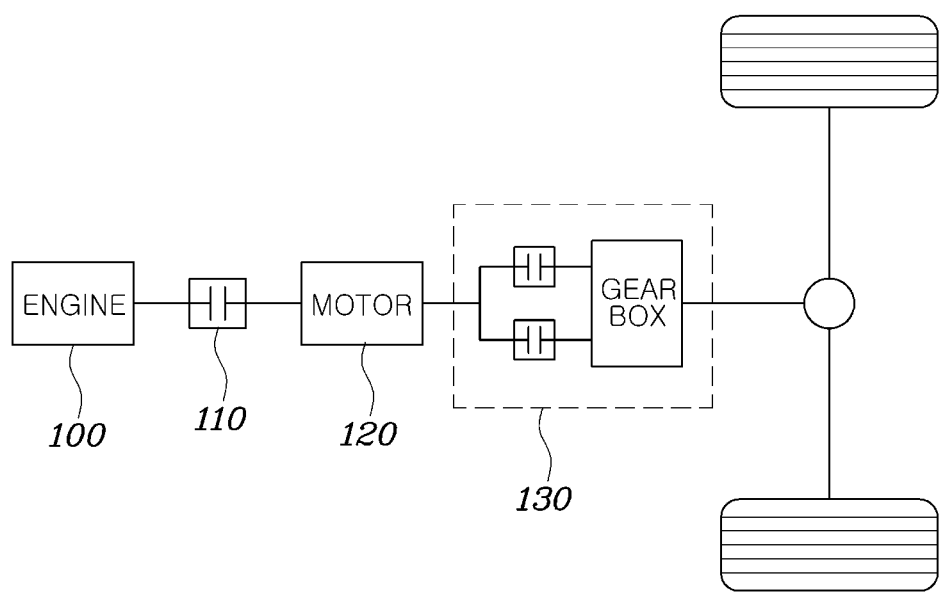
FIG. 3 is a block diagram illustrating a clutch failure diagnostic apparatus of a DCT in accordance with an embodiment of the present disclosure.

FIG. 2 is a flowchart illustrating a clutch failure diagnostic method of a DCT in accordance with an embodiment of the present disclosure and FIG. 3 is a block diagram illustrating a clutch failure diagnostic apparatus of a DCT in accordance with an embodiment of the present disclosure.

With reference to FIGS. 2 and 3, a clutch failure diagnostic method of a DCT may include comparing, by a controller (not shown), wheel torque of a vehicle with driving load torque of the vehicle (not shown) (Operation S10), confirming, by the controller, whether or not the vehicle is driving, if, as a result of a comparison (Operation S10), the wheel torque is greater than the driving load torque (Operation S20), and releasing, by the controller, a gear engaged with a non-drive shaft, if, as a result of confirmation (Operation S20), the vehicle is in a stopped state (Operation S30). The method may further include reconfirming, by the controller, whether or not the vehicle is driving (Operation S40), after release (Operation S30), and judging, by the controller, that a transmission clutch of the non-drive shaft fails, if, as a result of reconfirmation (Operation S40), the vehicle is driving (Operation S50).

Particularly, the controller may execute the comparison (Operation S10), if the driving mode of the vehicle is an EV mode or if an engine clutch 110 is released. Here, the engine clutch 110 is an engine clutch applied to a transmission mounted electric device-type vehicle in which the engine clutch is provided between an engine 100 and a motor 120.

That is, if the driving mode of the vehicle is the EV mode or if the engine clutch 110 is in a released state, the engine 100 does not influence a driving system and, thus, whether or not a clutch of a transmission 130 fails, i.e., is stuck, may not be diagnosed through whether or not the speed of the engine 100 and the speed of the clutch of the transmission 130 are synchronized.

In order to sense the stuck-on, or other, failure of the clutch of the transmission 130 even in the above situation, the controller may calculate wheel torque and driving load torque of the vehicle and then compare wheel torque and driving load torque with each other. Here, the wheel torque may be an index indicating torque transmitted to driving wheels of the vehicle so as to drive the vehicle, and the driving load torque may be an index indicating a resistance torque value to impede driving of the vehicle.

The controller may receive information regarding motor torque through a motor control unit (MCU) and calculate the wheel torque based on the received motor torque. Further, the controller may calculate the driving load torque based on rolling resistance and slope resistance of the vehicle. In detail, the controller may calculate rolling resistance and slope resistance of the vehicle using characteristic values, such as a tire pressure, a tire friction coefficient and a road grade, etc. Characteristic values, such as the above-described tire pressure and road grade, may be received through a separate pressure sensor and a gradient sensor, etc. Various methods for calculating wheel torque and driving load torque using received characteristic values are known and a detailed description thereof will thus be omitted.

If, as a result of the comparison (Operation S10), the wheel torque is greater than the driving load torque, the controller may judge whether or not the vehicle is stopped (Operation S20). That is, the vehicle should be driving if the wheel torque is greater than the driving load torque but, if the stuck-on failure of the clutch of the transmission 130 occurs, the vehicle does not drive. Therefore, the stuck-on failure of the clutch of the transmission 130 may be diagnosed accordingly.

However, the stuck-on failure of the clutch of the transmission 130 may not be determined using only the above-described conditions. The reason for this is that, if the vehicle is in the stopped state due to an obstacle, the vehicle may not also drive. Therefore, the controller needs to distinguish a clutch stuck-on failure situation and an obstacle-based stopped situation from each other.

For this purpose, the controller may release a gear engaged with the non-drive shaft of the transmission 130 (Operation S30) and then reconfirm whether or not the vehicle is driving (Operation S40).

That is, if a stuck-on failure of the non-drive shaft clutch occurs, when a gear engaged with the non-drive shaft is released from the non-drive shaft, the wheel torque may be greater than the driving load torque and thus the vehicle will drive. On the other hand, if the vehicle is in the stopped state due to an obstacle, even when a gear engaged with the non-drive shaft is released from the non-drive shaft, the vehicle will maintain the stopped state. Therefore, if, as a result of the reconfirmation (Operation S40), the vehicle is in the stopped state, the controller may judge that the clutch of the non-drive shaft of the transmission 130 is normally operating. Therethrough, the controller may accurately diagnose whether or not the stuck-on failure of the non-drive shaft clutch of the transmission 130 occurs.

In more detail, in the release (Operation S30), the controller may release a first gear, when a shift lever is located at the position R, and release a second gear, when the shift lever is located at the position N or position D.

The controller may sense the position of the shift lever through an inhibiter switch connected to the shift lever and, in general, the controller executes pre-selection in which the first gear is engaged with the non-drive shaft when the shift lever is located at the position R and the second gear is engaged with the non-drive shaft when the shift gear is located at the position D.

Therefore, if the wheel torque of the vehicle is greater than the driving load torque of the vehicle and the vehicle is in the stopped state, the controller may diagnose whether or not the stuck-on failure of the non-drive shaft clutch occurs by releasing the pre-selected first gear or second gear depending on the position of the shift lever.

In more detail, for the purpose of clear understanding, the transmission 130 may be a dual clutch transmission (DCT) in which a plurality of clutches is provided, and the controller may be a transmission control unit (TCU).

As is apparent from the above description, in a clutch failure diagnostic method of a DCT in accordance to an embodiment of the present disclosure, even if a vehicle provided with the DCT is in an EV mode, the stuck-on failure of a clutch of the DCT may be properly diagnosed at an early stage, improving vehicle and DCT performance.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:
1. A diagnostic method of determining clutch failure of a dual clutch transmission (DCT), comprising:
   comparing, by a controller, a wheel torque of a vehicle with a driving load torque of the vehicle;
   confirming, by the controller, whether or not the vehicle is driving, if, as a result of the comparing step, the wheel torque is greater than the driving load torque;
   releasing, by the controller, a gear engaged with a non-drive shaft, if, as a result of the confirming step, the vehicle is in a stopped state;
   reconfirming, by the controller, whether or not the vehicle is driving, after the releasing step; and
   judging, by the controller, that a transmission clutch of the non-drive shaft fails, if, as a result of the reconfirming step, the vehicle is driving.
2. The diagnostic method of determining clutch failure according to claim 1, wherein the controller executes the comparing step if a driving mode of the vehicle is an electric vehicle (EV) mode.

3. The diagnostic method of determining clutch failure according to claim 1, wherein the controller executes the comparing step, if an engine clutch is released.

4. The diagnostic method of determining clutch failure according to claim 1, wherein, if, as a result of the reconfirming step, the vehicle is determined to be in the stopped state, the controller judges that the transmission clutch of the non-drive shaft is in a normal state.

5. The diagnostic method of determining clutch failure according to claim 1, wherein, in the releasing step, the controller releases a first gear when a shift lever is located at a position R and releases a second gear when the shift lever is located at a position N or a position D.

* * * * *